United States Patent
Li

(10) Patent No.: US 9,516,019 B2
(45) Date of Patent: Dec. 6, 2016

(54) METHOD, SYSTEM AND TERMINAL FOR ENCRYPTING/DECRYPTING APPLICATION PROGRAM ON COMMUNICATION TERMINAL

(71) Applicant: ZTE CORPORATION, Shenzhen, Guangdong (CN)

(72) Inventor: Xipeng Li, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/436,183

(22) PCT Filed: Jul. 22, 2013

(86) PCT No.: PCT/CN2013/079782
§ 371 (c)(1),
(2) Date: Apr. 16, 2015

(87) PCT Pub. No.: WO2013/182154
PCT Pub. Date: Dec. 12, 2013

(65) Prior Publication Data
US 2015/0288685 A1    Oct. 8, 2015

(30) Foreign Application Priority Data
Oct. 17, 2012  (CN) .......................... 2012 1 0395287

(51) Int. Cl.
*H04L 29/06* (2006.01)
*G06F 21/12* (2013.01)

(52) U.S. Cl.
CPC ......... *H04L 63/0853* (2013.01); *G06F 21/123* (2013.01); *H04L 63/083* (2013.01); *H04L 63/0876* (2013.01)

(58) Field of Classification Search
CPC .................. G06F 21/6218; G06F 21/78; G06F 2221/2107; G06F 2221/2153; H04L 9/0897; H04L 9/3234
(Continued)

(56) References Cited

U.S. PATENT DOCUMENTS 8,200,192 B2   6/2012  Hsu et al.
8,572,392 B2 * 10/2013 Ishidera .................. G06F 21/34
                                                    380/279
(Continued)

FOREIGN PATENT DOCUMENTS

CN        101420697        4/2009
CN        101568115       10/2009
(Continued)

OTHER PUBLICATIONS

International Search Report for PCT/CN2013/079782, English translation attached to original, Both completed by the Chinese Patent Office on Oct. 12, 2013, All together 5 pages.
(Continued)

*Primary Examiner* — Samson Lemma
(74) *Attorney, Agent, or Firm* — Brooks Kushman P.C.

(57) ABSTRACT

A method, system and terminal for encrypting and decrypting an application program on a communication terminal are disclosed, including the communication terminal using an identification number of a subscriber identification card as an encryption key, performing encryption processing on an application program to be protected, and obtaining an encrypted application program. The method, system and terminal also include, when a user accesses the encrypted application program, the communication terminal performing matching processing on an identification number of a subscriber identification card inserted currently and the encryption key, and if a processing result is that the identi-
(Continued)

fication number of the subscriber identification card inserted currently is matched with the encryption key, performing decryption processing on the encrypted application program for the user to use.

13 Claims, 2 Drawing Sheets

(58) Field of Classification Search
USPC .................................................. 713/159, 193
See application file for complete search history.

(56) References Cited

U.S. PATENT DOCUMENTS

| | | | |
|---|---|---|---|
| 8,918,633 | B2 | 12/2014 | Yoshihiro et al. |
| 2003/0123670 | A1 | 7/2003 | Shimada et al. |
| 2005/0221853 | A1* | 10/2005 | Silvester ................. G06F 21/35 455/551 |
| 2006/0018484 | A1 | 1/2006 | Yoshihiro et al. |
| 2006/0112275 | A1* | 5/2006 | Jeal ......................... G06F 21/12 713/183 |
| 2007/0040021 | A1 | 2/2007 | Nakayma |
| 2009/0122989 | A1* | 5/2009 | Asnaashari ............. G06F 21/77 380/278 |
| 2010/0185843 | A1* | 7/2010 | Olarig ................. G06F 21/6218 713/2 |
| 2011/0026506 | A1* | 2/2011 | MacNaughtan ...... G01S 5/0236 370/338 |
| 2012/0327819 | A1* | 12/2012 | Liang ..................... G06K 19/07 370/277 |
| 2013/0067241 | A1 | 3/2013 | Yamamoto |
| 2013/0143622 | A1* | 6/2013 | Zhao ..................... H04B 1/3816 455/558 |
| 2014/0229339 | A1* | 8/2014 | Massiere ............ G06Q 20/3229 705/26.81 |

FOREIGN PATENT DOCUMENTS

| | | | |
|---|---|---|---|
| CN | 202025348 | 11/2011 | |
| CN | 102292732 | 12/2011 | |
| CN | 102938032 | 2/2013 | |
| FR | WO 2005084107 A2 * | 9/2005 | .......... G06F 21/123 |
| JP | 2003250183 A | 9/2003 | |
| JP | 2005128996 A | 5/2005 | |
| JP | 2005310041 A | 11/2005 | |
| JP | 2006013641 A | 1/2006 | |
| JP | 2009080772 A | 4/2009 | |
| WO | 2005084107 | 9/2005 | |

OTHER PUBLICATIONS

Extended European Search Report for European Application No. 13800249.8, Completed by the European Patent Office, Dated Aug. 11, 2015, 5 Pages.
Office Action from Japanese patent application No. 2015-537119, dated Jun. 7, 2016, 3 pages.

\* cited by examiner

METHOD, SYSTEM AND TERMINAL FOR ENCRYPTING/DECRYPTING APPLICATION PROGRAM ON COMMUNICATION TERMINAL

CROSS-REFERENCE TO RELATED APPLICATION

This application is the U.S. national phase of PCT Application No. PCT/CN2013/079782 filed Jul. 22, 2013 which claims priority to Chinese Application No. 201210395287.3 filed Oct. 17, 2012, the disclosures of which are incorporated in their entirety by reference herein.

TECHNICAL FIELD

The present document relates to the field of communication terminal technology, and specifically, to a method, system and terminal for encrypting and decrypting an application program through a key of a subscriber identification card.

BACKGROUND OF THE RELATED ART

With the rapid development of smartphone terminals in recent years, the mainstream smartphones all support a subscriber identification card at present and they can download and install a great many application programs from the application market, but users do not have particularly effective protection measures on the access of the application programs installed in mobile phones at present, once others get your mobile phone, they can randomly check the application programs installed and the privacy information left in the mobile phone, such as mobile banking information and QQ account information and so on, that is, there exists a higher risk for the access and use of the application programs of the smartphones.

For terminals of the smart mobile type, the installation of application programs is very common, and a great deal of privacy information of the users is therein saved, thus it shows a trend of increasing data security problems. How to improve the security of application programs and user privacy information related to the application programs in the terminals of smart mobile type becomes a very important new subject, and there has been no mature scheme in the industry at present. The patent with an application number of CN201120101853.6 discloses a method for encrypting a TF card, and the scheme implements a method for encrypting a TF storage card on the whole, but it does not support the protection for the specific application programs installed in the communication terminal and the user information related to the application programs.

SUMMARY OF THE INVENTION

The object of the embodiments of the present invention is to provide a method, system and terminal for encrypting and decrypting an application program on a communication terminal, and the terminal performs permission authentication through a Personal Identification Number (PIN) code, and performs encryption and decryption operation on the application program by using an identification number of a subscriber identification card.

The embodiment of the present invention provides a method for encrypting and decrypting an application program on a communication terminal, which comprises:

the communication terminal using an identification number of a subscriber identification card as an encryption key, performing encryption processing on an application program to be protected, and obtaining an encrypted application program;

when a user accesses the encrypted application program, the communication terminal performing matching processing on an identification number of a subscriber identification card inserted currently and the encryption key; and if a processing result is that the identification number of the subscriber identification card inserted currently is matched with the encryption key, performing decryption processing on the encrypted application program for the user to use.

Alternatively, the method further comprises: before performing encryption processing on the application program to be protected, the communication terminal prompting the user to enter a subscriber identification card password, and sending a password authentication request containing the subscriber identification card password to the subscriber identification card;

the communication terminal receiving an authentication result returned by the subscriber identification card, and if the authentication is successful, acquiring the identification number of the subscriber identification card used as the encryption key.

Alternatively, after the encryption processing is performed on the application program to be protected, encryption state information of the encrypted application program is saved, wherein the encryption state information comprises the encryption key.

Alternatively, after the decryption processing is performed on the encrypted application program, the communication terminal extracts the subscriber identification card password entered by the user, and sends a password authentication request containing the subscriber identification card password to the subscriber identification card;

a password authentication response of the subscriber identification card is received, if the authentication is successful, making the user access and use the application program.

Alternatively, the subscriber identification card comprises a SIM card, a USIM card and a UIM card;

alternatively, the identification number of the subscriber identification card comprises an international mobile subscriber identification number IMSI and an integrated circuit card identity ICCID;

alternatively, the subscriber identification card password comprises an ADM code, a PIN1 code and a PIN2 code.

The embodiment of the present invention provides a system for encrypting and decrypting an application program on a communication terminal, which comprises:

an encryption module, configured to: use an identification number of a subscriber identification card as an encryption key, perform encryption processing on an application program to be protected, and obtain an encrypted application program; and a decryption module, configured to: when a user accesses the encrypted application program, perform matching processing on an identification number of a subscriber identification card inserted currently and the encryption key, and if a processing result is that the identification number of the subscriber identification card inserted currently is matched with the encryption key, perform decryption processing on the encrypted application program for the user to use.

Alternatively, a subscriber identification card password authentication module is further configured to: before performing encryption processing on the application program to be protected, extract a subscriber identification card password entered by the user, send a password authentication request containing the subscriber identification card password to the subscriber identification card, and receive a password authentication response of the subscriber identification card responding to the request, and if the authentication is successful, acquire the identification number of the subscriber identification card used as the encryption key.

Alternatively, the subscriber identification card password authentication module is further configured to: after performing decryption processing on the encrypted application program, extract the subscriber identification card password entered by the user, send a password authentication request containing the subscriber identification card password to the subscriber identification card, and receive a password authentication response of the subscriber identification card responding to the request, and if the authentication is successful, make the user access and use the application program.

Alternatively, a storage module is configured to: after performing encryption processing on the application program to be protected, save encryption state information of the encrypted application program, wherein the encryption state information comprises the encryption key.

The embodiment of the present invention provides a terminal for encrypting and decrypting an application program on a communication terminal, which comprises the above system.

Compared with the related art, the beneficial effects of the embodiments of the present invention lie in that:

in the embodiments of the present invention, by encrypting an application program installed in a terminal through a key in a subscriber identification card, a user can freely select an application required to be encrypted in the terminal, which enhances the security of the application program in the terminal when being accessed and used without influencing the access experience of the user for programs with low security requirements, and enhances the security of private data of the user in the terminal without losing good user experience.

PREFERRED EMBODIMENTS OF THE INVENTION

The embodiments of the present invention will be described in detail below in combination with the accompanying drawings. It should be understood that, the descriptions below are only used to explain and illustrate the patent document, which is not used to limit the patent document.

Figure 1:
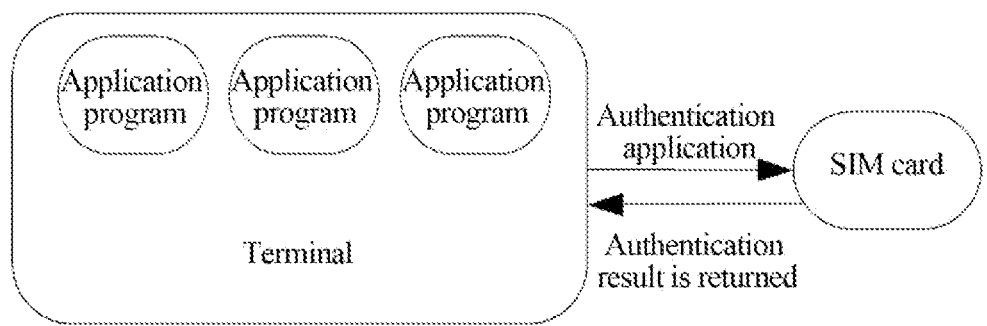
FIG. 1 is a structural schematic diagram of a system for encrypting an application program on a communication terminal provided in the embodiment of the present invention.

FIG. 1 shows a structural schematic diagram of a system for encrypting an application program on a communication terminal provided in the embodiment of the present invention, which includes a subscriber identification card, application programs and a terminal. The application programs are installed in the terminal, and when a user uses the application programs, privacy information will be generated sometimes. FIG. 1 shows a relation diagram between the terminal and the subscriber identification card (i.e. an SIM card), before used for accessing the installed application programs, the terminal and the SIM card are required to go through an authentication operation process, and after the process ends, the SIM card returns an authentication result to the terminal: authentication is successful or authentication is failed.

Figure 2:
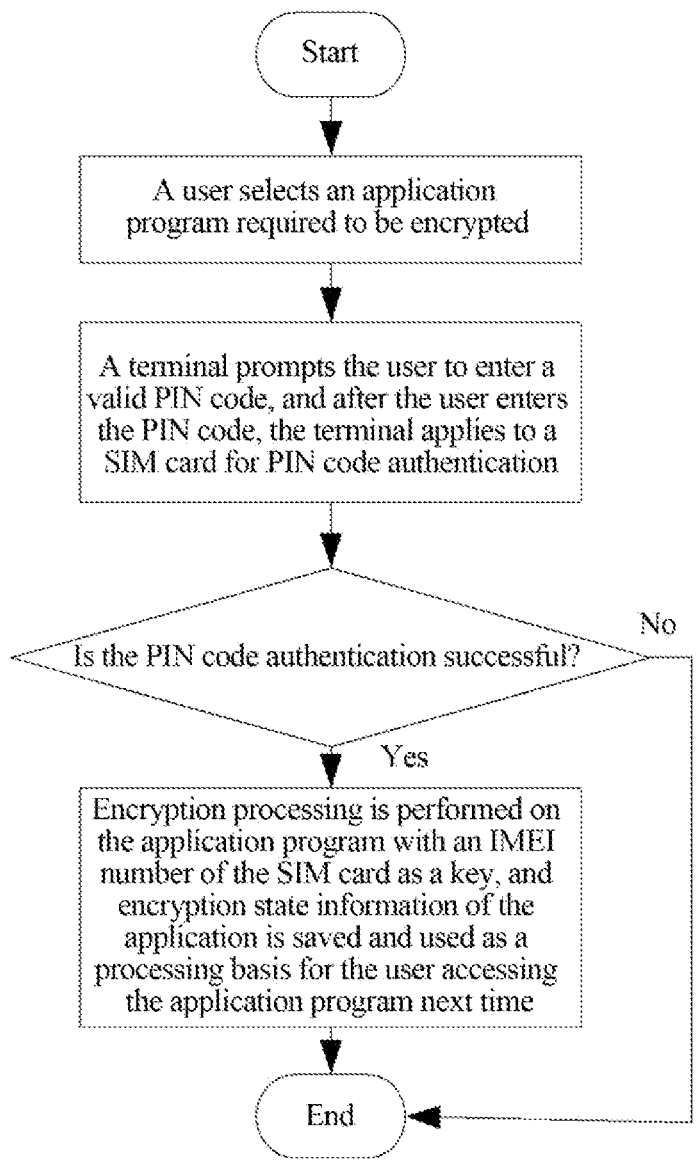
FIG. 2 is a flow diagram of a processing method for a communication terminal encrypting an application program provided in the embodiment of the present invention.

FIG. 2 is a flow diagram of a processing method for a communication terminal encrypting an application program provided in the embodiment of the present invention, and as shown in FIG. 2, the encryption process includes that:

an implementation way of the application encryption entry mode is not unique, and it is assumed that the implementation way is entering through an application encryption menu of the terminal in the present document. The user enters the application encryption menu through an interactive menu of the terminal, and the related background programs will be started to perform relevant processing through selection operations of the menu.

We assume that the menu lists the application programs which have been installed in the current terminal at this point, and the user selects an application program required to be encrypted, and the terminal displays a prompt box at this point, to prompt the user to enter a PIN code of the SIM card.

After the user enters the PIN code, the terminal extracts PIN code information entered by the user, applies to the SIM card for PIN code authentication, and if the authentication is successful, the terminal extracts an identification number of the subscriber identification card in the SIM card to serve as a key and performs encryption operation on the application program. After the encryption is finished, encryption state information of the application program is recorded and saved, and the encryption state information includes the encryption key, which is used as a basis for processing and judging when the user accesses the application program next time. If a result of failed PIN code authentication is returned, the encryption operation fails.

Figure 3:
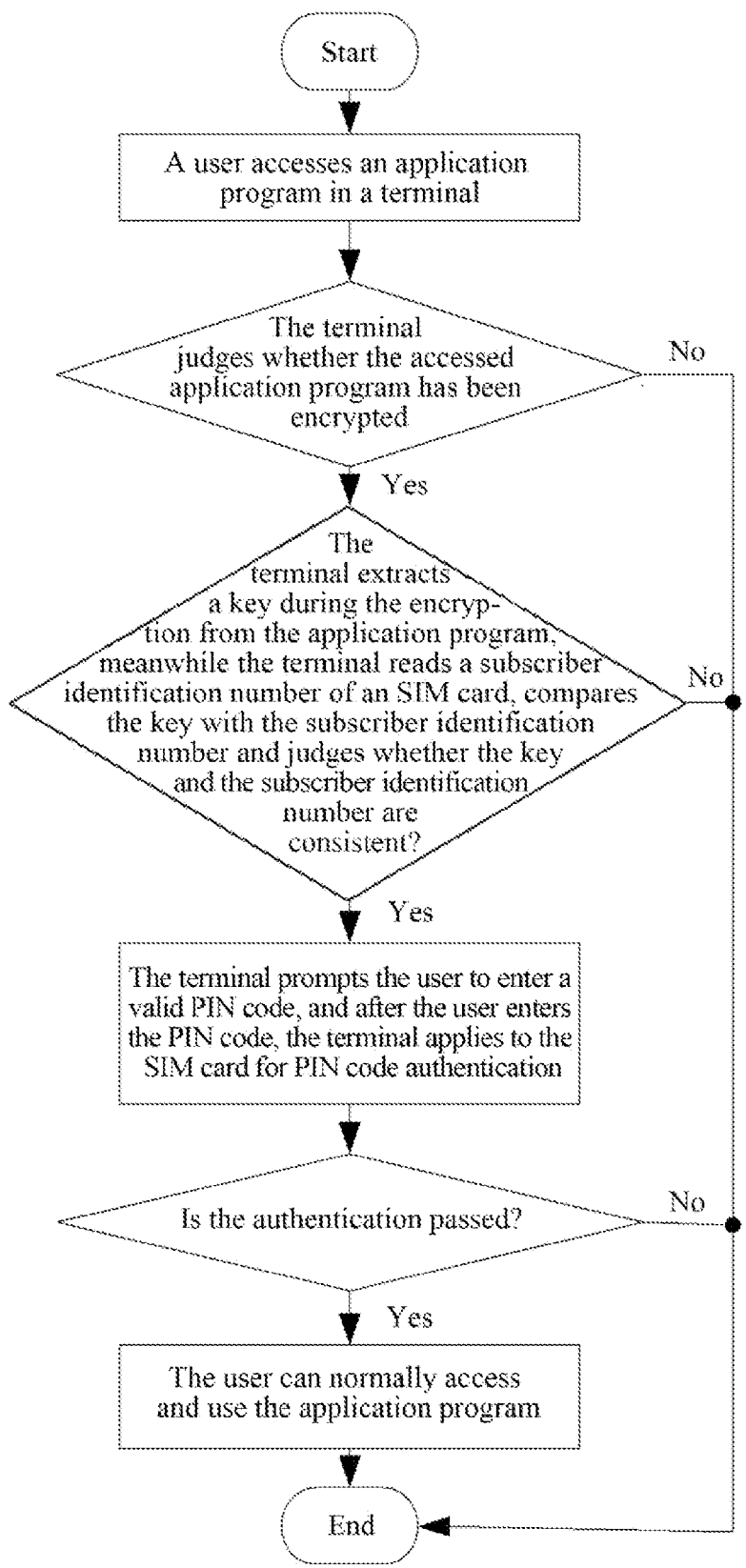
FIG. 3 is a flow diagram of a processing method when a user accesses an application program provided in the embodiment of the present invention.

FIG. 3 is a flow diagram of a processing method when a user accesses an application program provided in the embodiment of the present invention, and as shown in FIG. 3, the decryption process includes that:

when the user accesses an application program in the terminal, firstly the terminal judges an access permission of the application program, and if the application program has been encrypted, the terminal will proceed to the next processing process.

The terminal extracts a key used during the encryption from the application program, and the key is the identification number of the SIM card in the terminal when the application program is encrypted. Meanwhile, the terminal will read a subscriber identification number of an SIM card inserted into the terminal at this moment, compare the key with the subscriber identification number and judge whether the key and the subscriber identification number are consistent, if they are consistent, proceeding to the next processing process. If the key and the subscriber identification number are inconsistent, the authentication is failed, and the user cannot access and use the application program.

Following the last step, when the authentication is passed, the terminal will prompt the user to enter a valid PIN code at this point, and after the user enters the PIN code, the terminal extracts the PIN code information and then applies to the SIM card for PIN code authentication. If a returned authentication result is success, the user can normally access and use the application program. Otherwise, the user cannot access and use the application program.

In the embodiments of the present invention, the subscriber identification card includes but is not limited to: a SIM card and a UIM card and so on, cards belonging to the subscriber identification card are all within the protection scope of the present patent.

In the embodiments of the present invention, the function of the identification number of the subscriber identification card is to establish an association relationship between a specific application program in the terminal and a SIM card in the terminal during the encryption, and a function thereof is to guarantee a unique binding relation between the SIM card and the application program, that is, if the user changes to other SIM cards, the application program cannot be decrypted.

In the embodiments of the present invention, all information that can be read from the SIM card and can reflect the uniqueness of the SIM card, namely the identification number of the subscriber identification card, is within the protection scope of the present patent application. The identification number of the subscriber identification card includes an International Mobile Subscriber Identification Number (IMSI) and an Integrated Circuit Card Identity (ICCID) and so on.

The terminal supports the subscriber identification card such as the SIM card. The subscriber identification card includes but is not limited to: a SIM card, a USIM card and a UIM card and so on, cards belonging to the subscriber identification card are all within the protection scope of the present patent.

A password is saved in the subscriber identification card, and if the user knows an initial password, the password can be changed. The key in the subscriber identification card includes but is not limited to: an ADM code, a PIN1 code and a PIN2 code and so on, and passwords that can be used for implementing the method of the present document are all within the protection scope.

The embodiment of the present invention also discloses a terminal, which includes the above system for encrypting the application program by using the key of the subscriber identification card. The terminal includes a mobile terminal and a fixed terminal.

In conclusion, the embodiments of the present invention have the following technical effects.

in the embodiments of the present invention, by encrypting an application program installed in a terminal through a key in a subscriber identification card, a user can freely select an application required to be encrypted in the terminal, which enhances the security of the application program in the terminal when accessed and used without influencing the access experience of the user for programs with low security requirements and enhances the security of private data of the user in the terminal without losing good user experience.

Though the embodiments of the present invention have been described in detail above, but the patent document is not limited to this, and the skilled in the art can make various modifications according to the principle of the patent document. Therefore, it should be understood that all the modifications made according to the principle of the patent document fall into the protection scope of the patent document.

INDUSTRIAL APPLICABILITY

In the embodiments of the present invention, by encrypting an application program installed in a terminal through a key in a subscriber identification card, a user can freely select an application required to be encrypted in the terminal, which enhances the security of the application program in the terminal when accessed and used without influencing the access experience of the user for programs with low security requirements and enhances the security of private data of the user in the terminal without losing good user experience.

What is claimed is:

1. A method for encrypting and decrypting an application program on a communication terminal, comprising:

the communication terminal using an identification number of a subscriber identification card as an encryption key, performing encryption processing on an application program to be protected, and obtaining an encrypted application program;

when a user accesses the encrypted application program, the communication terminal performing matching processing on an identification number of a subscriber identification card inserted currently and the encryption key;

if a processing result is that the identification number of the subscriber identification card inserted currently is matched with the encryption key, performing decryption processing on the encrypted application program using the identification number of the subscriber identification card inserted currently;

before performing encryption processing on the application program to be protected, the communication terminal prompting a user to enter a subscriber identification card password, and sending a password authentication request containing the subscriber identification card password to the subscriber identification card;

the communication terminal receiving an authentication result returned by the subscriber identification card, and if the authentication is successful, acquiring the identification number of the subscriber identification card used as the encryption key.

2. The method according to claim 1, further comprising:

after performing encryption processing on the application program to be protected, saving encryption state information of the encrypted application program, wherein the encryption state information comprises the encryption key.

3. The method according to claim 2, further comprising:

after performing decryption processing on the encrypted application program, the communication terminal prompting a user to enter a subscriber identification card password, and sending a password authentication request containing the subscriber identification card password to the subscriber identification card;

the communication terminal receiving an authentication result returned by the subscriber identification card, and if the authentication is successful, making the user access and use the application program.

4. The method according to claim 1, wherein the subscriber identification card comprises a SIM card, a USIM card and a UIM card;

the identification number of the subscriber identification card comprises an international mobile subscriber identification number IMSI and an integrated circuit card identity ICCID;

the subscriber identification card password comprises an ADM code, a PIN1 code and a PIN2 code.

5. The method according to claim 2, wherein
the subscriber identification card comprises a SIM card, a USIM card and a UIM card;
the identification number of the subscriber identification card comprises an international mobile subscriber identification number IMSI and an integrated circuit card identity ICCID;
the subscriber identification card password comprises an ADM code, a PIN1 code and a PIN2 code.

6. The method according to claim 3, wherein
the subscriber identification card comprises a SIM card, a USIM card and a UIM card;
the identification number of the subscriber identification card comprises an international mobile subscriber identification number IMSI and an integrated circuit card identity ICCID;
the subscriber identification card password comprises an ADM code, a PIN1 code and a PIN2 code.

7. A system for encrypting and decrypting an application program on a communication terminal, comprising:
a terminal;
an application program to be protected;
a subscriber identification card;
an encryption module, implemented by the terminal and configured to: use an identification number of a subscriber identification card as an encryption key, perform encryption processing on the application program to be protected, and obtain an encrypted application program;
a decryption module, implemented by the terminal and configured to: when a user accesses the encrypted application program, perform matching processing on an identification number of the subscriber identification card inserted currently and the encryption key, and if a processing result is that the identification number of the subscriber identification card inserted currently is matched with the encryption key, perform decryption processing on the encrypted application program using the identification number of the subscriber identification card inserted currently; and
a subscriber identification card password authentication module, implemented by the terminal and configured to: before performing encryption processing on the application program to be protected, extract a subscriber identification card password entered by a user, send a password authentication request containing the subscriber identification card password to the subscriber identification card, and receive a password authentication response of the subscriber identification card responding to the request, and if the authentication is successful, acquire the identification number of the subscriber identification card used as the encryption key.

8. The system according to claim 7, wherein
the subscriber identification card password authentication module is further configured to: after performing decryption processing on the encrypted application program, extract a subscriber identification card password entered by a user, send a password authentication request containing the subscriber identification card password to the subscriber identification card, and receive a password authentication response of the subscriber identification card responding to the request, and if the authentication is successful, make the user access and use the application program.

9. The system according to claim 7, further comprising:
a storage module, implemented by the terminal and configured to: after performing encryption processing on the application program to be protected, save encryption state information of the encrypted application program, wherein the encryption state information comprises the encryption key.

10. A terminal for encrypting and decrypting an application program on a communication terminal, comprising the system according to claim 7.

11. The system according to claim 8, further comprising:
a storage module, implemented by the terminal and configured to: after performing encryption processing on the application program to be protected, save encryption state information of the encrypted application program, wherein the encryption state information comprises the encryption key.

12. A terminal for encrypting and decrypting an application program on a communication terminal, comprising the system according to claim 8.

13. A terminal for encrypting and decrypting an application program on a communication terminal, comprising the system according to claim 9.

* * * * *